(12) United States Patent
Graff et al.

(10) Patent No.: US 9,964,934 B2
(45) Date of Patent: May 8, 2018

(54) DATA ACQUISITION UNIT AND AUTOMATION SYSTEM

(71) Applicant: FESTO AG & Co. KG, Esslingen (DE)

(72) Inventors: Uwe Graff, Ostifildern (DE); Herbert Hufnagl, Aichwald (DE)

(73) Assignee: FESTO AG & CO. KG, Esslingen (DE)

( * ) Notice: Subject to any disclaimer, the term of this patent is extended or adjusted under 35 U.S.C. 154(b) by 774 days.

(21) Appl. No.: 14/377,015

(22) PCT Filed: Jul. 13, 2013

(86) PCT No.: PCT/EP2013/002086
§ 371 (c)(1),
(2) Date: Aug. 6, 2014

(87) PCT Pub. No.: WO2015/007297
PCT Pub. Date: Jan. 22, 2015

(65) Prior Publication Data
US 2015/0168928 A1      Jun. 18, 2015

(51) Int. Cl.
*G05B 15/02* (2006.01)
*G05B 19/042* (2006.01)

(52) U.S. Cl.
CPC ........... *G05B 15/02* (2013.01); *G05B 19/042* (2013.01); *G05B 2219/31121* (2013.01); *G05B 2219/31124* (2013.01); *G05B 2219/31132* (2013.01); *G05B 2219/31211* (2013.01); *Y02P 90/18* (2015.11)

(58) Field of Classification Search
None
See application file for complete search history.

(56) References Cited

U.S. PATENT DOCUMENTS

| | | | |
|---|---|---|---|
| 8,543,748 B2 * | 9/2013 | Kerr, III | G05B 19/0423 710/107 |
| 2007/0010968 A1 * | 1/2007 | Longsdorf | G08C 19/02 702/183 |
| 2009/0240604 A1 * | 9/2009 | Thurston | G06Q 10/0875 705/29 |
| 2013/0041485 A1 * | 2/2013 | Gunzert | G05B 19/4186 700/79 |

FOREIGN PATENT DOCUMENTS

| | | | |
|---|---|---|---|
| DE | 10245176 | 4/2004 | |
| DE | 10245176 A1 * | 4/2004 | ......... G05B 19/0426 |
| DE | 102008027935 | 12/2009 | |
| DE | 102008027935 A1 * | 12/2009 | ........... G05B 19/056 |
| DE | 102010038457 | 2/2012 | |
| DE | 102010038457 A1 * | 2/2012 | ......... G05B 19/0426 |

(Continued)

*Primary Examiner* — Isaac T Tecklu
(74) *Attorney, Agent, or Firm* — Hoffmann & Baron, LLP

(57) ABSTRACT

A data acquisition unit for an automation system, with at least one communications interface which is designed for connection to an operating bus and is set up to receive control commands from a field unit and data from operating bus participants with a processing device which is designed for the processing of the received control commands and/or data to give processing results, and with a memory device designed for the storage of processing results.

16 Claims, 1 Drawing Sheet

(56) References Cited

FOREIGN PATENT DOCUMENTS

| | | | |
|---|---|---|---|
| DE | 102011080569 | 2/2013 | |
| EP | 2538609 | 12/2012 | |
| EP | 2538609 A1 * | 12/2012 | ......... G05B 19/4185 |
| WO | WO2008/039326 | 4/2008 | |
| WO | WO 2008039326 A2 * | 4/2008 | ......... G05B 19/4185 |

\* cited by examiner

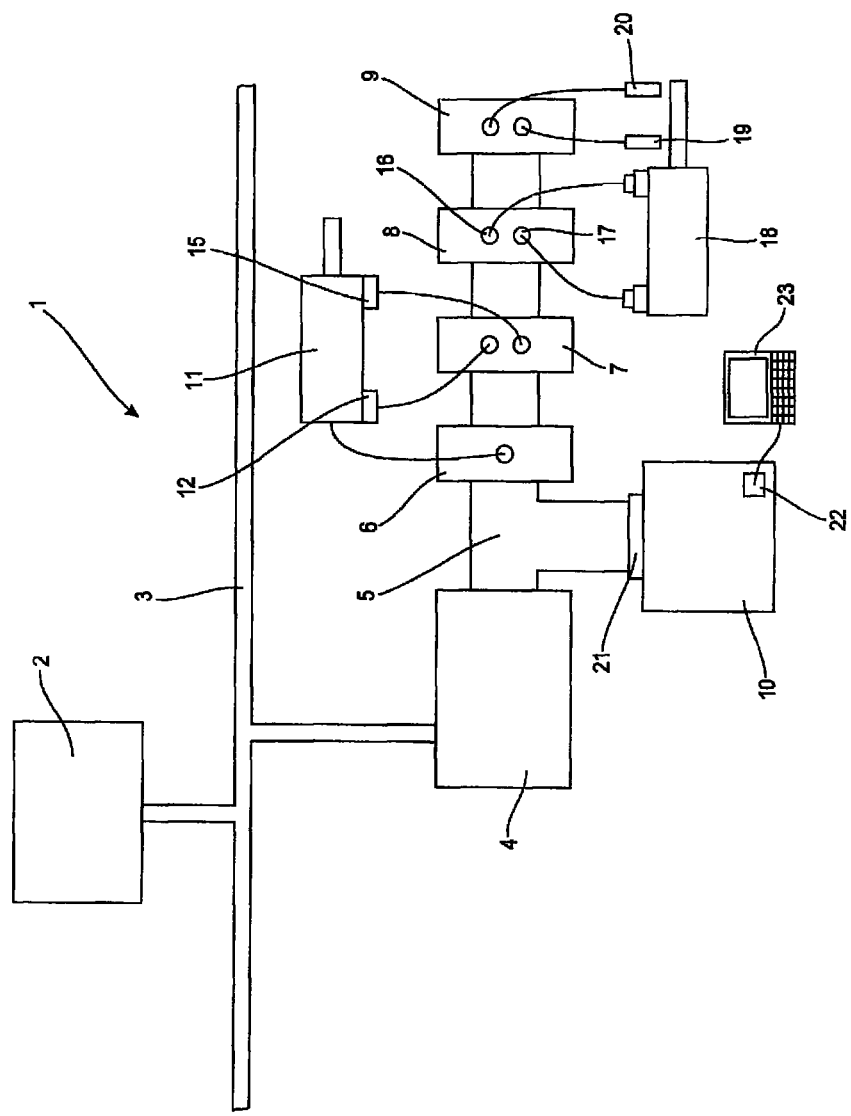

DATA ACQUISITION UNIT AND AUTOMATION SYSTEM

This application claims priority based on an International Application filed under the Patent Cooperation Treaty, PCT/EP2013/002086, filed Jul. 13, 2013.

BACKGROUND OF THE INVENTION

The invention relates to a data acquisition unit for an automation system, also an automation system with such a data acquisition unit.

Known from DE 10 2011 080 569 A1 is a system for the operation of field devices in an automation system, in which a higher-level control/operating unit has access to field devices over a communication network, and in which the communication network has on the control/operating level a first bus system with a first transfer protocol, and on the field level a second bus system with a second transfer protocol, wherein the conversion of the two transfer protocols is effected in a gateway. Here the gateway is equipped with basic software which, on the occurrence of an event, determines through a search the field devices located on the field level and uses the information determined regarding the field devices to download electronic device descriptions from an application server in which server apps are held, and to provide these to the control/operating unit for operation of the field devices.

SUMMARY OF THE INVENTION

The problem of the invention is to utilise information from and about operating bus participants of the automation system for the operation of the automation system, to a greater extent than formerly.

This problem is solved for a data acquisition unit of the type referred to above by the features of claim 1. Here it is provided that the data acquisition unit includes at least one communications interface which is designed for connection to an operating bus and is set up to receive control commands from a field unit and data from operating bus participants. The data acquisition unit also includes a processing device which is designed for the processing of the received control commands and/or data to give processing results, and a memory device designed for the storage of processing results.

The data acquisition unit may be in the form of a separate device, connected between the field unit and one of the operating bus participants, or it may be an integral part of the field unit or of an operating bus participant. The field unit has the task of driving the operating bus participants with control commands, which may be supplied at least partly over a higher-level bus system from a higher-level control unit, in particular a programmable logic controller. In this connection the field unit is designed to convert the bus communication with the higher-level control unit, which is effected over a first bus system in accordance with a preset first bus communication protocol, into a standardised or a proprietary operating bus protocol, by which the operating bus participants may be addressed.

The task of the data acquisition unit is to acquire, process and store at a suitable point in the operating bus the control commands from the field unit transferred in accordance with the second bus communication protocol applicable to the operating bus, together with data from the operating bus participants, also coded according to the second bus communication protocol. Here at least some of the operating bus participants may be so configured as to process internally data such as measured values from connected sensors, movement states of actuators or switching states of fluid valves, only passing it on via the operating bus when a suitable request is received from the field unit or an unusual state has occurred. Other operating bus participants may be set up to supply their data to the operating bus in full, to allow processing of this data in the field unit. Only a fraction of the data arriving at the field unit is passed on to the higher-level control unit, since the first bus system is able to transfer only a small volume of data per unit of time, and therefore only important status messages from individual field units or operating bus participants are transmitted to the higher-level control unit. In a known automation system, data from the operating bus participants is transmitted to the field unit, where it is checked for the presence of important information. Only if it is rated as important information is it coded in the first bus communication protocol and passed on to the higher-level control unit. Otherwise the data is rejected and is therefore no longer available for further consideration.

In contrast, with the data acquisition unit according to the invention, which is upstream of the field unit in the operating bus, some or all data supplied by the operating bus participants is processed and at least placed in buffer storage or where applicable even finally stored. In similar fashion, this also applies to the results of the processing of data from the operating bus participants. Consequently, the data obtained from the individual operating bus participants is not lost and may be used for additional purposes.

The processing unit is preferably a microcontroller or microprocessor, designed for the processing of high volumes of data and connected to the memory device, which may for example be a solid-state memory, to facilitate data interchange between processing unit and memory device.

Advantageous developments of the invention are the subject of the dependent claims.

It is expedient for the processing device to be at least partly freely programmable, in order to facilitate user-specific processing of control commands and/or data. The manufacturer of the data acquisition unit and/or the user therefore have the option of running different programs in the processing device, in order for example to make possible processing of the data from the operating bus participants which is geared to the special needs of the user.

In an advantageous development of the invention it is provided that the processing device is assigned a data interface, in particular in the form of a computer interface, for communication with an external database, in order to facilitate the transfer of processing results to the database and/or a transfer of database content to the processing device. With the aid of the data interface, data from the operating bus participants and/or processing results may be transferred to the external database. In addition or alternatively, provision may be made for the transfer of database content from the external database to the processing device. Preferably the data interface conforms to an interface standard, as known from the field of personal computers (PCs) or multi-function telephones (smartphones). Here the data interface may be designed for cable-bound and/or cable-free data transfer, for example as a USB interface, a Bluetooth interface, or a LAN or WLAN interface. In any case, the data interface allows the user easy and direct access to the data acquisition unit using customary computer means, as described above, without the need for special modification of the computer means to the data acquisition unit for this purpose.

Preferably it is provided that the communications interface is designed for bi-directional communication with the operating bus participants, in order to ensure transfer of processing results and/or of memory content of the memory device and/or of operating bus participant data which may be provided from an external data source, to the operating bus participants. In this way it is possible to transfer information from the data acquisition unit to the operating bus participants via the operating bus. Consequently it is possible to provide for example that a user may have influence on the operating bus participants via suitable computer means connected to the data interface of the data acquisition unit, without for example having to take the route via a higher-level control unit connected to the field unit, for example a programmable logic controller (PLC).

It is advantageous if the processing device and the memory device are designed for the processing and storage of operating bus participant data from the following group: identification data, operating time data, parameters, status data, sensor data, power consumption data, error data, program status data and user information. In the case of identification data this involves in particular a sequence of letters and numbers allocated individually and uniquely by the manufacturer of the operating bus participant, by which the operating bus participant may be clearly identified. The operating time data may include information such as a date of initial operation of the operating bus participant, an actual duration of use of the operating bus participant, a number of operating cycles, a maximum duration of use for calibrated operating bus participants or the like. The parameters may involve for example user-defined settings which may be either set directly at the relevant operating bus participant, and/or be preset via the operating bus, staring from the higher-level control unit or the computer means which may be connected to the data acquisition unit. Status data may include for example information about a switching state of an electrically or electromagnetically driven valve or about a supply of power to an electrical drive. The sensor data involve measured values, in particular digitally coded measured values provided by sensors which may be connected to at least one operating bus participant and may be transferred via the operating bus at least to the data acquisition unit and where applicable also to the field unit. Power consumption data gives information over current and/or cumulative power consumption of the operating bus participant or at least a power load connected to the operating bus participant, such as for example an actuator. If the operating bus participant or a device connected to the operating bus participant such as a sensor or actuator is equipped with a self-diagnosis function, then error messages may be transmitted via the operating bus to the field unit and at the same time also stored in the data acquisition unit, either temporarily or permanently. Many operating bus participants and also at least some of the devices connectable to the operating bus participants, in particular microcontrollers or microprocessors, have their own means of data processing. These means of data processing require, to execute the functions demanded of them, programming which is in most cases changeable and is also described as firmware. For example the operating bus participants and/or devices may be provided before delivery with specific programming which, however, becomes outdated over time or has faults and therefore may need to be replaced. Here it is advantageous when this programming includes information over program status, in particular a version number or a revision status. With the aid of this program status data, the data acquisition unit can determine whether or not the operating bus participant or device concerned has an up-to-date program status, or if the programming should be if possible updated. It is also possible to store in the data acquisition unit user information such as for example data sheets or operating instructions for the operating bus participants or devices connected to them. Preferably the processing and storage of the data is used to derive further information and/or models from this data and to make it accessible to the user.

In a development of the invention it is provided that the processing device and the memory device are designed for access to program data of operating bus participants, in order to effect a change in program data. Consequently, the data acquisition unit serves to keep the program status of the operating bus participants up-to-date, without the need for disassembly of the operating bus participants or time-consuming activation of the operating bus participants through the higher-level control unit.

It is expedient for the processing device and the memory device to be designed for independent wire-bound or wireless access to external databases in order, with the aid of the operating bus participant data, in particular the information data, to determine up-to-date information concerning the operating bus participants which may then be stored for further use and/or transmitted to the operating bus participants. For this purpose it may be provided that the data acquisition unit, via the data interface or through additional communication means such as for example a WLAN module or a mobile telephone module, makes wire-bound or wireless contact with databases, preferably available on the internet and, with the aid of operating bus participant data, in particular the identification data, is able to determine up-to-date information concerning the operating bus participants. This information may for example include updated program data or updated parameter sets for the operating bus participants or devices connected to them.

It is advantageous if the processing device and the memory device are designed, with the aid of identification data and program status data of the operating bus participants connected to the operating bus, to compile a program status table for the operating bus participants connected to the operating bus, in order to facilitate a preview of the operative readiness of the operating bus participants before implementation of program updating of individual or all operating bus participants and/or a return of individual or all operating bus participants to a previous program status. With the aid of such a program status table, a prediction may be made as to whether the operating bus participants connected to the operating bus, together with any devices connected to the operating bus participants, such as for example sensors or actuators, are able to work together faultlessly or whether, because of differing program status of the individual operating bus participants or devices, known malfunctions may occur. The program status table may also be used to check imminent updating of the program status of individual or all operating bus participants and/or devices connected to them for malfunctions to be expected. Preferably the data acquisition unit is set up to archive the program status of operating bus participants at least temporarily in order for example, after implementation of program status updating and the detection of malfunctions, to effect a return of individual or all operating bus participants to a previous program status and thus to recreate the functioning of these operating bus participants.

Preferably it is provided that the processing device and the memory device are designed so as to process the data of several operating bus participants into a data set of a virtual operating bus participant and to output the data set via the operating bus, in particular to the field unit. With the aid of this function, even complex processes on or hi the equipment which is equipped with the operating bus participants, may be summarized in a single sensor signal. In addition or alternatively, the data from several operating bus participants may be fed into a neuronal network from which data sets may be obtained which have only an indirect relationship with the data determined from the real operating bus participants. In any event, the processing of data of several operating bus participants to a common data set can lead to a reduction in the data volume which must be transmitted over the operating bus, without any compelling loss of information occurring.

In an advantageous development of the invention it provided that the processing device and the memory device are designed to store user settings for one or more operating bus participants and as required, in particular after an interchange of operating bus participants, to make these available to the operating bus participants concerned. This makes it possible for operating bus participants to be interchanged without the need for time-consuming setting or parameterization, in particular via input means provided on the operating bus participant or via the higher-level control unit, of the replacing operating bus participants. Instead the data acquisition unit is designed to request settings from the operating bus participants used before, to place these in buffer storage, and to transfer the stored settings to the replacing operating bus participants when operating bus participants are interchanged. This meets the desire to obtain maximum possible availability of operating bus participants combined with good ease of use.

In a further variant of the invention it is provided that the processing device is assigned a time clock, in particular a radio clock, in order to provide incoming data to the processing device with time stamps, and to store data and/or processing results derived from it with time stamps in the memory device. With the aid of the time clock, data arriving at the data acquisition unit may be stored in correct chronological order and drawn upon at a later point in time for evaluation purposes. By this means it is also possible for data from different operating bus participants, which reaches the data acquisition unit at different points in time and/or with different frequency, to be brought together in a correct chronological relationship.

It is advantageous when the processing device and the memory device are designed so as to make analyses on incoming and stored data for diagnostic and/or documentation purposes, in particular by means of a neuronal network. With this facility, operating bus participants connected to the operating bus and also if fi applicable devices connected to them may be monitored advantageously for possible malfunctions and/or changes over time. This may be effected, for example by a comparison of older and more recent data supplied to the data acquisition unit by a particular operating bus participant to be examined. If one of the operating bus participants involves a device with preset maintenance intervals and/or a known lifespan, then the analysis of data may be used, for example with the aid of time switched on and/or a number of operating cycles, to determine when maintenance should take place or when a replacement of the operating bus participant should be made shortly before life expiry. In addition or alternatively the analysis of the stored data may also be used to document a mode of operation of the operating bus participants and/or devices connected to it such as for example sensors and/or actuators. Precisely in the case of complex technical installations which are provided with such operating bus participants, this can mean a simplification in documentation of the process carried out by this technical facility, in particular a production or treatment process.

In an advantageous development of the invention it is provided that the processing device and the memory device are so designed that, via the operating bus, individual operating bus participants may be placed on standby or switched off, in order to ensure by this means a presettable power consumption of the operating bus participants connected to the operating bus, in particular variable over time. For example, stored in the processing device are various power consumption models for the operating bus participants connected to the operating bus, which may be applied to the operating bus participants by means of a control command from the field unit or by independent action of the data acquisition unit. In this connection it may be provided in particular for specific operating bus participants to be placed on standby at preset intervals of time, in order to save power for the operating bus participants as a whole. During these intervals of time it may also be provided that data from still active operating bus participants are so processed in the data acquisition unit that plausible information over the status of the technical facility equipped with the operating bus participants may be derived from this data, which would otherwise be supplied by the operating bus participants active outside the particular interval of time. By this means for example, during phases of reduced activity of the technical facility, it is possible to obtain a saving in energy, without losing ail status information relating to the technical facility.

It is expedient for the processing device and the memory device to be so designed that they provide at the communications interface in a variable manner data packets which are based on the data and/or processing results and which are designed for transfer via the operating bus to a higher-level control unit. In this way, the data acquisition unit behaves relative to the higher-level control unit preferably like an operating bus participant, for example like an operating bus participant equipped with or connected to one or more sensors. Preferably the data acquisition unit is assigned a fixed or presettable identification, designed to correspond to the identifications of the other operating bus participants connected to the operating bus, and facilitating direct communication between the field unit and the data acquisition unit.

The problem of the invention is solved according to a second aspect by an automation system, as specified in claim 15. This automation system includes a higher-level control unit connected to at least one field unit via a first bus system and communicating with the field unit in accordance with a first bus protocol, together with an operating bus emanating from the field unit and to which are connected several operating bus participants which communicate with the field unit in accordance with a second bus protocol, wherein a data acquisition unit according to any of claims 1 to 14 is connected to the operating bus and is designed for local processing of data from the operating bus participants.

BRIEF DESCRIPTION OF THE DRAWING

An advantageous embodiment of the invention is shown in the drawing, showing in

FIG. 1: a schematic view of an automation system with a higher-level control unit and a field unit with an operating bus to which several operating bus participants are connected.

DETAILED DESCRIPTION OF THE PREFERRED EMBODIMENTS

The single FIGURE shows in a schematic view an automation system 1 such as may be installed for example on a production machine or a machine tool. By way of example the automation system 1 includes a higher-level control unit 2, which may be for example in the form of a programmable logic controller. The automation system 1 also includes a field bus 3 connected to the higher-level control unit 2, and a field unit 4 similarly connected to the field bus 3. Data transfer via the field bus 3 between the higher-level control unit 2 and the field unit 4 takes place in accordance with a communications protocol applicable to the field bus 3. The field bus 3 may be for example a data bus based on the conventions of Profibus, CanOpen, Devicenet, IndustrialEthernet, Profinet, Ethercat and others. Owing to limited bandwidth and depending on the chosen bus type, only limited volumes of data and only data from a prescribed dataset may be transferred between the field unit 4 and the higher-level control unit 2.

The field unit 4, which is designed to connect the field bus 3 to lower-order terminals described in detail below, includes a converter, not shown in detail, and also described as a gateway. The converter is designed to convert data and control signals of the higher-level control unit 2, which are coded in accordance with the communications protocol applicable to the field bus 3, into a communications protocol of an internal bus system which is also described as the operating bus 5 and where applicable is also designed for the conversion of data, also in the opposite direction.

Connected to the operating bus 5 as terminals are several operating bus participants 6, 7, 8 and 9 together with a data acquisition unit 10. By way of example, the operating bus 5 has a distinctly greater bandwidth for data transfer than the field bus 3 and makes possible, in addition to the transfer of control signals and data from the higher-level control unit 2 to the operating bus participants 6, 7, 8 and 9, also the transfer of further data, described in detail below, which may be provided by the operating bus participants 6, 7, 8 and 9.

By way of example, the operating bus participant 6 is in the form of a motor controller for an electrical actuator 11 and is connected to the actuator 11 via a cable connection. Operating bus participant 7 is in the form of an input module, and is connected via sensor cables to two position sensors 12, 15 mounted on the actuator 11. Operating bus participant 8 is for example in the form of a valve assembly with two operating ports 16, 17, connected via fluid, lines to a pneumatic cylinder 18, Operating bus participant 9 is in the form of put module and connected via sensor cables to two proximity switches 19, 20 mounted adjacent to piston rod of the pneumatic cylinder 18.

During operation of the automation system 1, signals are sent continuously from the position sensors 12, 15 and the proximity switches 19, 20 to the respectively connected operating bus participant 7, 9. Preferably it is provided that these signals are pre-processed in the operating bus participants 7, 9, in particular being digitised through analog-digital conversion, and then incorporated in the bus communication protocol of the operating bus 5 and passed on to the operating bus 5. It is also possible to provide for internal signals of the operating bus participants 6 and 8, for example status and/or error messages to be incorporated in the bus communication protocol of the operating bus and passed on to the latter. This data transferred over the operating bus 5 is accordingly also supplied to a communications interface 21 of the data acquisition unit 10 and may therefore be received and further processed by the data acquisition unit 10.

For this purpose the data acquisition unit 10 includes a processing device, not shown, and a memory device, also not shown. The operating device is preferably so designed that it is able to acquire, process and pass on to the memory device a considerable part, in particular all, of the data transferred via the operating bus 5. The memory device is so designed, in respect of its storage speed and memory capacity, that it is able to store the data transferred the opera bus 5, which has been processed by the processing device, as far as possible completely and for an adequate length of time.

By way of example, the data acquisition unit 10 is equipped with a data interface 22 which is electrically connect to the processing device and is for example in the form of Universal Serial Bus interface (USB interface), to make possible in a simple manner connection to commercially available computer means such as for example a portable computer or mobile telephone. Independently of the data interface, the data acquisition unit 10 may have a further communications interface, not shown, which is designed for direct communication between the data acquisition unit and a database, not shown, for example on a computer which may be addressed wirelessly. Via this communications interface the data acquisition unit 10 may for example open up internet access, in order to address databases which are filed there.

A mode of operation of the data acquisition unit 10 integrated in the automation system 1 may be described as follows:

When the automation system 1 is brought into operation for the first time, first of all the identification data of the operating bus participants 6, 7, 8 and 9 is determined by the field unit 4, so as to make possible communication between the field unit 4 and the operating bus participants 6, 7, 8 and 9. Since the data acquisition unit 10 is looped into the operating bus 5, it can like the field unit 4 acquire the provided identification data of the operating bus participants 6, 7, 8 and 9 and store it in the memory device.

As soon as the field unit 4 has determined the identification data of the operating bus participants 6, 7, 8 and 9 it can, via the field bus 3, pass on a release signal to the higher-level control unit 2, to give notice that control commands from the higher-level control unit 2 are now being received and, after processing in the field unit 4, may be passed on to the operating bus participants 6, 7, 8 and 9. The field unit 4 may also begin to evaluate data such as for example signals from the position sensors 12, 15 and/or the proximity switches 19, 20 in order for example, on receipt of control signals from the higher-level control unit 2, to commence regulated or controlled operation of the actuator 11 and/or the pneumatic cylinder 18.

The data acquisition unit 10 may be so configured that, with provision of electrical power to the operating bus participants 6, 7, 8 and 9, it begins to receive, process and store the control signals and data transferred via the operating bus 5. At the same time provision may be made for the incoming data to be provided with time stamps, in order to facilitate chronologically correct processing and storage. Moreover, the data acquisition unit 10 may also be set up, together with the identification data found, to store the start of use of the operating bus participants 6, 7, 8 and 9 used in the automation system 1.

In a further step, provision may be made for the data acquisition unit 10 to read out the program status of the operating bus participants 6, 7, 8 and 9 and to store this status data in a program status table.

In a further step, it may be provided that the data acquisition unit 10, with the aid of the determined program status, in particular using a suitable program, determines whether or not the operating bus participants 6, 7, 8 and 9 may be used with one another without problems and/or where applicable modifications to the operating bus participants 6, 7, 8 and 9 or their programming are necessary.

In a further step, it may be provided for the data acquisition unit 10 to retrieve and store user settings made to the operating bus participants 6, 7, 8 and 9.

In a further step, it may be provided that the data acquisition unit 10, in particular with the aid of a web server, provides on a computer connected at the data interface 22, a graphical user surface, with the help of which a user may make user settings for the respective operating bus participants 6, 7, 8 and 9. This is of special importance if there are no input facilities for user settings on the operating bus participants 6, 7, 8 and 9. In addition or as an alternative, the data acquisition unit 10 may use the connected computer to retrieve data relating to the operating bus participants 6, 7, 8 and 9 from a database, and pass this data on to the operating bus participants 6, 7, 8 and 9. This data may be for example parameterization data or up-to-date programs, in particular firmware, for the operating bus participants 6, 7, 8 and 9. Consequently it is advantageous when the data acquisition unit 10 is in the position—where applicable after clearance by the user—to pass such data on to the operating bus participants 6, 7, 8 and 9 automatically, and for example to undertake updating of the program status of individual or all operating bus participants 6, 7, 8 and 9 automatically.

In a further step, it may be provided that the data acquisition unit 10 determines firstly, before updating the program status of the operating bus participants 6, 7, 8 and 9, with the aid of a program status table compiled or to be compiled, whether or not trouble-free operation of the operating bus participants 6, 7, 8 and 9 is also ensured after implementing the intended updating. It may also be provided in a subsequent step for the respective previous program status of the operating bus participants 6, 7, 8 and 9 to be updated to be stored in the data acquisition unit 10.

In a further step, it may be provided that the data acquisition unit 10 processes data from the operating bus participants 6, 7, 8 and 9 transferred via the operating bus 5 in a manner which leads to new data, which may be fed to the field unit 4 and from there via the field bus 3 to the higher-level control unit 2, This new data may be determined in particular with the aid of a neuronal network in order for example, on the basis of sensor data supplied by the operating bus participants 6, 7, 8 and 9, to reproduce one or more sensors in virtual form, which are not able to find use in the automation system 1 for example for reasons of cost or space.

In a further step, it may be provided that the data acquisition unit 10 makes a time-based, in particular chronological evaluation of data from the operating bus participants 6, 7, 8 and 9, in order for example to determine recurring patterns in the stored data, or to identify changes in sensor data over time, which might be related to a deterioration in performance of the sensors concerned or which may have other causes. Preferably there are stored in the data acquisition unit 10 preset limit values which may be used to classify the evaluations made, so as to give a user, who accesses the data acquisition unit 10 for example via the data interface 22, information as to whether or not the operating bus participants 6, 7, 8 and 9 are still operating correctly or have possible malfunctions.

In a further step, it may be provided that the data acquisition unit 10 is able to access a database, preferably Internet-based, with the aid of the identification data of the operating bus participants 6, 7, 8 and 9 and via the communication interface, not shown, which may for example be in the form of a WLAN modem or mobile telephone interface, or via a computer connected to the data interface 22. Here for example it is possible to retrieve documents relating to the operating bus participants 6, 7, 8 and 9 such as data sheets or operating instructions, which may then be stored in the data acquisition unit 10, where they may be made directly accessible to a user in case of malfunction via the data interface 22, without the user first having to search for the relevant documents in another place.

In a further step, provision may be made for the data acquisition unit 10 either on demand from the higher-level control unit 2, or due to a suitable user input via the data interface 22, or through continuous measures, to hold the power consumption of the connected operating bus participants 6, 7, 8 and 9 at a low level, so far as this is compatible with the tasks which the operating bus participants 6, 7, 8 and 9 are intended to perform. Here it may be provided that the data acquisition unit 10 delays and/or modifies control signals from the field unit 4, directed to the operating bus participants 6, 7, 8 and 9, in order for example to facilitate better coordination of activities of the individual operating bus participants 6, 7, 8 and 9.

The invention claimed is:

1. A data acquisition unit for an automation system, the data acquisition unit comprising:
   at least one communications interface connected to an operating bus for receiving control commands from a field unit and data from operating bus participants;
   a processing device for processing of the received control commands and/or data and for processing results based on the received control commands and/or data; and
   a memory device for storing of the processing results processed by the processing device,
   wherein the processing device and the memory device access program data of the operating bus participants, in order to effect a change in program data, and
   wherein the communications interface bi-directionally communicates with the operating bus participants, in order to ensure transfer of processing results and/or of memory content of the memory device and/or of operating bus participant data which may be provided from an external data source, to the operating bus participants.

2. The data acquisition unit according to claim 1, wherein the processing device is at least in part freely programmable, in order to facilitate user-specific processing of control commands and/or data.

3. The data acquisition unit according to claim 1, wherein the processing device is assigned a data interface in the form of a computer interface, the computer interface communicating with an external database, in order to facilitate the transfer of processing results to the database and/or a transfer of database content to the processing device.

4. The data acquisition unit according to claim 1, wherein the processing device and the memory device processes and stores operating bus participant data from the following group: identification data, operating time data, parameters, status data, sensor data, power consumption data, error data, program status data and user information.

5. The data acquisition unit according to claim 1, wherein the processing device and the memory device independently accesses external databases in order, with the aid of the operating bus participant data, to determine up-to-date information concerning the operating bus participants which may then be stored for further use and/or transmitted to the operating bus participants.

6. The data acquisition unit according to claim 1, wherein the processing device and the memory device, with the aid of identification data and program status data of the operating bus participants connected to the operating bus, compiles a program status table for the operating bus participants connected to the operating bus, in order to facilitate a preview of the operative readiness of the operating bus participants before implementation of program updating of individual or all operating bus participants and/or a return of individual or all operating bus participants to a previous program status.

7. The data acquisition unit according to claim 1, wherein the processing device and the memory device process the data of several operating bus participants into a data set of a virtual operating bus participant and output the data set via the operating bus to the field unit.

8. The data acquisition unit according to claim 1, wherein the processing device and the memory device store user settings for one or more operating bus participants and as required, after an interchange of operating bus participants, make the user settings available to the operating bus participants concerned.

9. The data acquisition unit according to claim 1, wherein the processing device is assigned a time clock, in order to provide incoming data to the processing device with time stamps, and to store data and/or processing results derived from it with time stamps in the memory device.

10. The data acquisition unit according to claim 1, wherein the processing device and the memory device make analyses of incoming and stored data for diagnostic and/or documentation purposes by means of a neuronal network.

11. The data acquisition unit according to claim 1, wherein the processing device and the memory device, via the operating bus, place individual operating bus participants on standby or switch individual operating bus participants off, in order to ensure by this means a presettable power consumption of the operating bus participants connected to the operating bus variable over time.

12. The data acquisition unit according to claim 1, wherein the processing device and the memory device provide at the communications interface in a variable manner data packets which are based on the data and/or processing results and which are designed for transfer via the operation bus to a higher level control unit.

13. An automation system comprising:
a higher-level control unit;
at least one field unit;
a first bus system connecting the higher-level control unit to the at least one field unit, the higher-level control unit communicating with the field unit in accordance with a first bus protocol;
an operating bus emanating from the field unit;
a plurality of operating bus participants connected to the operating bus, the plurality of bus participants communicating with the field unit in accordance with a second bus protocol; and
a data acquisition unit connected to the operating bus between the field unit and the plurality of bus participants, the data acquisition unit comprising:
at least one communications interface connected to the operating bus for receiving control commands from the field unit and data from the plurality of operating bus participants;
a processing device for processing the received control commands from the field unit and the data from the plurality of operating bus participants and for processing results based on the received control commands and data; and
a memory device for storing of the processing results processed by the processing device,
wherein the processing device and the memory device access program data of the operating bus participants, in order to effect a change in program data, and
wherein the communications interface bi-directionally communicates with the operating bus participants, in order to ensure transfer of processing results and/or of memory content of the memory device and/or of operating bus participant data which may be provided from an external data source, to the operating bus participants.

14. The data acquisition unit according to claim 1, wherein the processing device and the memory device are designed to store user settings for one or more operating bus participants and as required, after an interchange of operating bus participants, to make these available to the operating bus participants concerned.

15. A method for operating an automation system comprising:
obtaining identification data from a plurality of operating bus participants of the automation system when the automation system is brought into operation for the first time, the identification data being obtained by a field unit of the automation system so as to make possible communication between the field unit and the plurality of operating bus participants;
storing the identification data in a memory device of a data acquisition unit looped into an operating bus connecting the field unit to the plurality of operating bus participants;
passing a release signal to a higher-level control unit connected to the field unit by a field bus, the release signal being passed by the field unit upon determining the identification data of the plurality of operating bus participants to give notice that control commands from the higher-level control unit are now being received;
passing the control commands from the higher-level control unit on to the plurality of operating bus participants after processing in the field unit; and
evaluating data from the plurality of operating bus participants in the field unit upon receipt of control commands in order to commence regulated or controlled operation of the plurality of operating bus participants,
wherein a communications interface of the data acquisition unit bi-directionally communicates with the operating bus participants, in order to ensure transfer of processing results and/or of memory content of the memory device and/or of operating bus participant data which may be provided from an external data source, to the operating bus participants.

16. The method according to claim 15, wherein the plurality of operating bus participants comprises an actuator having a position sensor and a pneumatic cylinder having a proximity switch, and wherein the data from the plurality of operating bus participants evaluated in the field unit comprises signals from the position sensor and the proximity switch in order to commence regulated or controlled operation of the actuator and the pneumatic cylinder.

* * * * *

UNITED STATES PATENT AND TRADEMARK OFFICE
CERTIFICATE OF CORRECTION

| | | |
|---|---|---|
| PATENT NO. | : 9,964,934 B2 | Page 1 of 1 |
| APPLICATION NO. | : 14/377015 | |
| DATED | : May 8, 2018 | |
| INVENTOR(S) | : Graff et al. | |

It is certified that error appears in the above-identified patent and that said Letters Patent is hereby corrected as shown below:

In the Specification

Column 5, Line 2:  now reads "on or hi the,"
should read -- on or in the --

Column 5, Line 50:  now reads "also if fi applicable"
should read -- also if applicable --

Column 7, Line 51:  now reads "form of put module"
should read -- form of an input module --

Signed and Sealed this
Seventeenth Day of July, 2018

Andrei Iancu
*Director of the United States Patent and Trademark Office*